J. G. GROVE.
OIL TEST WRENCH.
APPLICATION FILED OCT. 25, 1920.
1,370,642.
Patented Mar. 8, 1921.
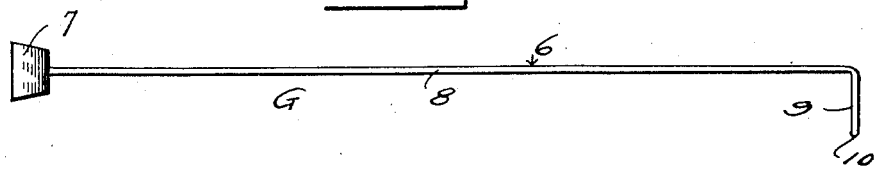
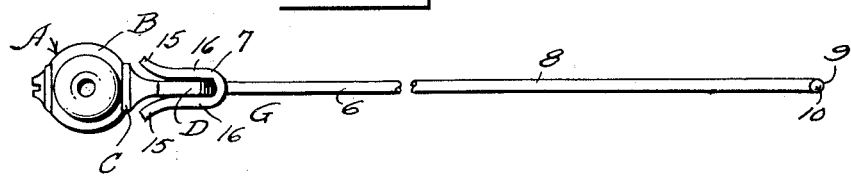
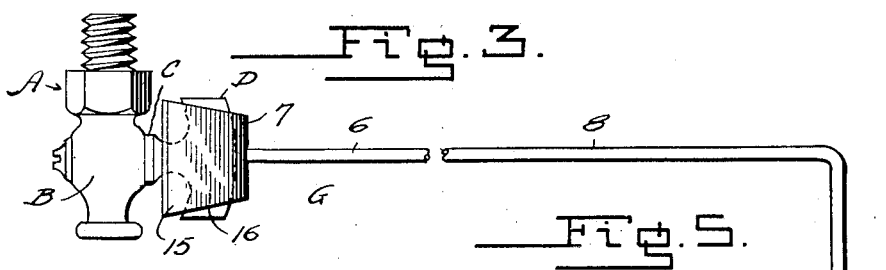
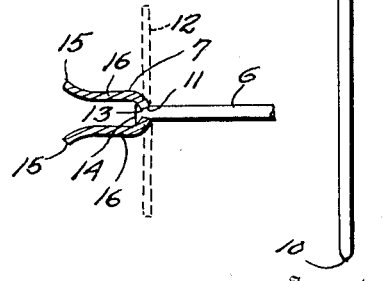
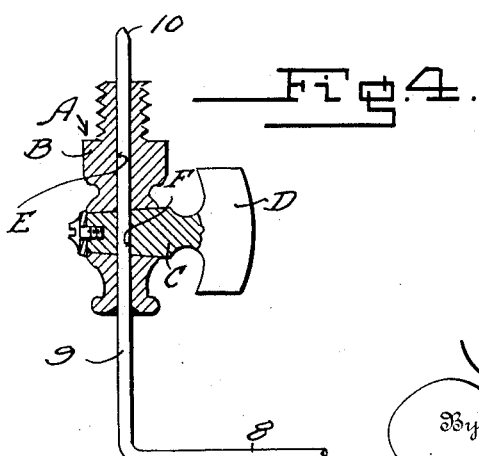
Inventor
Jesse G. Grove
Attorneys

UNITED STATES PATENT OFFICE.

JESSE G. GROVE, OF RED OAK, IOWA.

OIL-TEST WRENCH.

1,370,642.     Specification of Letters Patent.     Patented Mar. 8, 1921.

Application filed October 25, 1920. Serial No. 419,356.

*To all whom it may concern:*

Be it known that I, JESSE G. GROVE, a citizen of the United States, residing at Red Oak, in the county of Montgomery and State of Iowa, have invented certain new and useful Improvements in Oil-Test Wrenches, of which the following is a specification.

The present invention relates to tools and more particularly to a device which may be used for operating pet cocks and cleaning the same.

The principal objects of the invention are, to provide a tool of the character described which is well adapted to open and close, and clean if necessary the ways of pet cocks used in connection with the oil sump of Ford automobiles, without the necessity of the user reaching under the automobile; to so shape an element of the tool that it may be readily disposed into operative relation to the handle of the pet cock and there retained during the opening and closing of the pet cock; and to provide such tools with a handle and cleaner integral therewith, which is inexpensive to manufacture, light in weight and durable.

Other objects and advantages of the invention will appear in the following detailed description, taken in connection with the accompanying drawings, forming a part of this specification, and in which drawings:

Figure 1 is a side elevation of the tool.

Fig. 2 is an enlarged view of the tool in operative relation to a pet cock assuming that the tool has been given a quarter turn to open the pet cock, a portion of the handle being broken away to condense the view.

Fig. 3 is a view similar to Fig. 2 but in plan with the pet cock handle in open position.

Fig. 4 is a horizontal sectional view through the pet cock showing the cleaner portion or ram of the tool in the way of the pet cock.

Fig. 5 is a fragmentary view of a portion of the handle of the tool, showing the socket in cross section.

In the drawings where similar characters refer to similar parts throughout the views, A designates a pet cock including a body portion B of any desired shape and a tapering plug C, having a handle D, the body B and plug C having ways E and F respectively, adapted to be alined for the passage of fluid through the pet cock; and G designates the wrench.

Pet cocks, such as are illustrated in the official drawings are used in connection with the oil sump on automobiles, and particularly Ford automobiles, to enable a person to determine whether or not there is sufficient lubricating oil in the sump, or to permit of the removal of some of the oil, if too great a quantity has been poured into the crank case. These pet cocks are apt to become clogged, however, due to dust and dirt entering the crank case through the breather tube. The oil sump being located beneath the body of the car in close proximity to the longitudinal axis of the running gear, it is difficult to reach these pet cocks without stooping down and reaching beneath the fender, and other parts of the body, of the vehicle. At times it is necessary to resort to the use of a tool, such as pincers or pliers for turning the tapered member C, due to the fact that these pet cocks are exposed to moisture and dirt of the road, and stooping, in the manner above set forth, a person may successfully open the pet cocks, but if it has a tendency to stick, the tool used may slip from the handle D and too great a quantity of lubricating oil will pass out before a good hold may again be gained, thus resulting in the waste of lubricant. If clogged with sediment, a match or similar element is sometimes used to push the same from obstructing the ways E and F, but when such element is withdrawn and the oil flows out of the pet cock, the hand holding the element is very apt to become oily, making it difficult to close the pet cock by grasping the handle D.

Referring to the tool G, it comprises a handle portion which, in the example shown is formed of a relatively long piece of wire, of a gage such that it may be passed into the ways E and F, and a socket 7 which is preferably formed of sheet metal bent to U-shape. The handle 6, formed of a single piece of wire, as above set forth, is bent to provide a relatively long stem 8 and a relatively short stem 9 in angular relation thereto, at one end, the said stem preferably being rounded as at 10. This short stem 9 aids in imparting a circumferential movement to the handle, and may also serve as a ram for cleaning the bore or ways E and F of the pet cock, without the necessity of the user reaching beneath the body of the vehicle.

The socket 7 may be cheaply and conveniently formed of sheet metal and in the preferred embodiment is provided with a perforation 11 intermediate its ends, of a size substantially the diameter of the wire handle 6. The sheet of metal, properly shaped, and while flat, as indicated by dotted lines 12 in Fig. 5, may then be slipped upon the end portion of the long stem 8, opposite to short stem 9, and then bent to U-shape, as shown by full lines in Fig. 5. In so doing metal of the socket 7, bounding the perforation 11, bites into the wire handle 6 at opposite portions thereof, as indicated at 13, and thereby fixes the socket to the handle so as to turn with it, when a turning movement is imparted to the handle. The end portion of the handle 6 may be upset, slightly, as indicated at 14 to more securely attach the socket to the handle. This is a simple and efficient manner of attachment of the socket to the handle. The end portions of the U-shaped socket are preferably flared outwardly as indicated at 15 to facilitate guiding of the sockets into operative relation to the handle D. If desired, the socket may be made of slightly resilient material, and the portions 16 extending from the handle normally spaced a distance which is slightly less than the width of handle D, so that slight forward pressure longitudinally of the handle must be applied in order to dispose it into operative relation to the handle D after which a turning movement may be imparted to the handle, as through the offset short stem 9.

If, after opening the pet cocks, there is no flow, or a weak flow of oil therefrom, the short stem 9 may be forced through the alined ways E and F and when withdrawn, will permit some of the oil escaping to carry off the sediment, after which the socket 7 may be used to close the pet cock.

I claim:

1. A wrench for acting upon pet cocks comprising in combination a handle formed of a single piece of wire of a diameter to enter the bore of the pet cock, said handle being bent to provide a relatively long stem and a relatively short stem in angular relation thereto at one end, said short stem being adapted to act as a ram in the bore of the pet cock, and a socket member of U-shaped formation at the other end of said relatively long stem of the handle for engagement with the handle of the pet cock.

2. An oil test wrench comprising in combination a handle and a socket formed of a sheet of metal bent U-shape with its ends flaring outwardly and said handle being connected to the socket at its end opposite to said flaring ends.

3. An oil test wrench comprising in combination a wire handle and a socket formed of a sheet of material provided with a perforation intermediate its ends, the end of the wire handle extending through said perforation and the sheet of material being bent to U-shape with its base curved and a portion of the material bounding the perforation biting into the wire handle at opposite portions thereof to cause the socket to turn with the handle when a turning movement is imparted to the latter.

JESSE G. GROVE.